Aug. 8, 1939.   D. L. YABROFF ET AL   2,168,851
PROCESS FOR THE REMOVAL OF MERCAPTANS FROM MERCAPTIDE SOLUTIONS
Filed Oct. 18, 1938
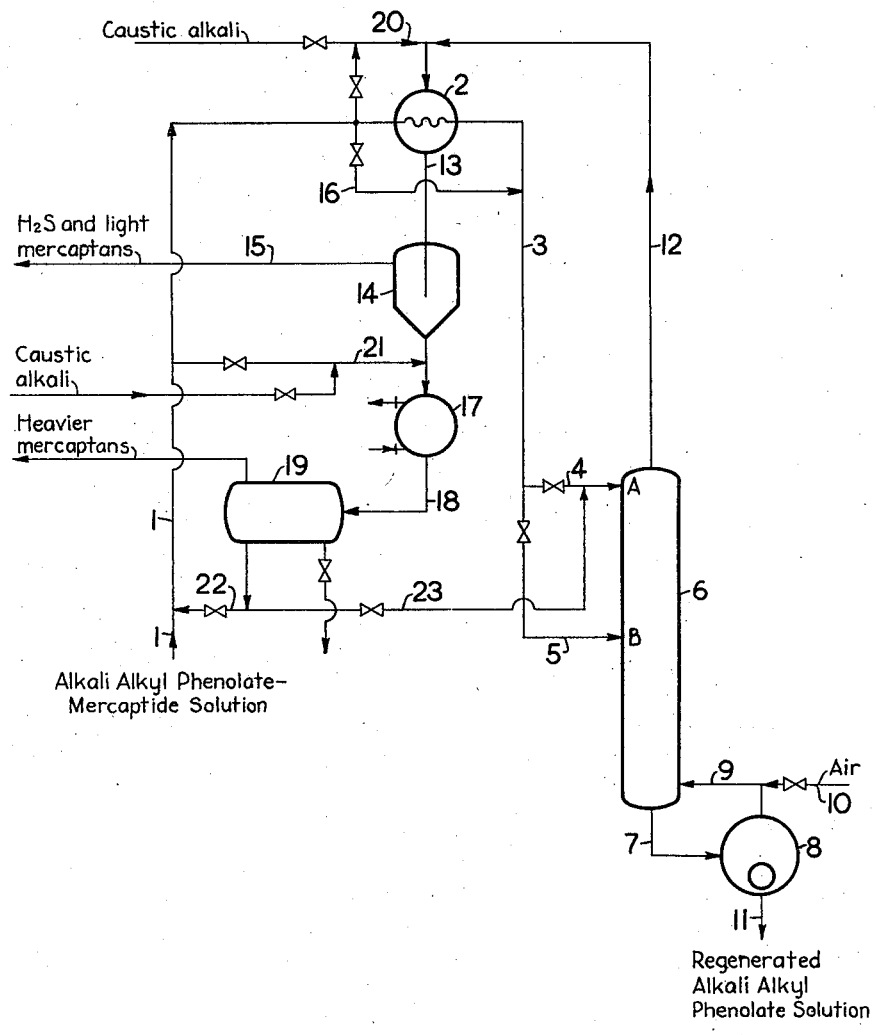
Inventors:
David Louis Yabroff
Ellis R. White
By their Attorney:

Patented Aug. 8, 1939

2,168,851

UNITED STATES PATENT OFFICE 2,168,851

PROCESS FOR THE REMOVAL OF MERCAPTANS FROM MERCAPTIDE SOLUTIONS

David Louis Yabroff, Berkeley, and Ellis R. White, Albany, Calif., assignors to Shell Development Company, San Francisco, Calif., a corporation of Delaware Application October 18, 1938, Serial No. 235,572

7 Claims. (Cl. 260—609)

This invention relates to the removal of mercaptans from alkaline reacting mercaptide solutions by steaming, and more particularly is concerned with the regeneration of spent caustic alkali solutions resulting from the extraction of mercaptans from hydrocarbon and similar organic liquids, containing mercaptides and solubility promoters for mercaptans in water comprising alkyl phenolates alone or in combination with other solutizers such as isobutyrate, for example, as disclosed in our application Serial No. 219,322, filed July 15, 1938.

This application is a continuation-in-part of our copending application Serial No. 174,512, filed November 15, 1937, in which a process was described for removing mercaptans by steaming from solutions of a caustic alkali which is substantially non-volatile under the conditions of the process, such as an alkali metal hydroxide which solutions contain mercaptides and an amount of solubility promoters for mercaptans at least sufficient to compensate the salting out effect of the average mercaptan from the aqueous caustic alkali solutions. In that process the mercaptide solution is diluted with water prior to steam stripping it, and after completed stripping it is reconcentrated. The steam produced in the concentrating step may be used for stripping. In the course of the stripping mercaptans are liberated from the mercaptide solution by the steam and are carried overhead. The overhead mixture of steam and mercaptans is condensed, whereby two liquid layers are formed, a lower layer of water and an upper layer of mercaptans. The layers are separated and the water which is substantially free from mercaptans, may be used for diluting the caustic alkali-mercaptide solution which enters the stripper.

It has further been pointed out that many useful solubility promoters are volatile under the stripping conditions, and unless vapors of these promoters are separated from the overhead steam mercaptan mixture in a refluxing zone at least a portion of the former may be condensed together with said mixture and, due to its solubility in liquid mercaptans may be lost.

Among the many active solubility promoters for mercaptans in aqueous solutions of caustic alkali, alkali metal alkyl phenolates, particularly in admixture with other solubility promoters such as the alkali metal salts of fatty acids having from 1–6 carbon atoms, are especially useful, as has been disclosed in our copending applications Serial Nos. 215,804, filed June 25, 1938 and 219,322, filed July 15, 1938. When steam stripping spent caustic alkali solutions containing alkyl phenolates and mercaptans for the purpose of removing mercaptans and regenerating the solution, we have found that there is a small though appreciable tendency for alkyl phenols to come overhead together with the stripping steam and liberated mercaptans. Since alkyl phenols are more soluble in mercaptans than in water, most of the alkyl phenols which go overhead are dissolved in the mercaptans upon condensation and thus are effectively lost. On account of this continuous drain of alkyl phenols from the phenolate solution during regeneration, the extraction efficiency of the caustic alkali solution for mercaptans soon drops and may become so low as to preclude sweetening of sour mercaptan solutions such as sour gasolines by simple extraction of the mercaptans.

According to this invention the above difficulty of continuously losing alkyl phenols in the steam stripping operation may effectively be overcome by injecting into the overhead stream, either before or after condensation, a small controlled amount of a caustic alkali solution, preferably the caustic alkali mercaptide solution to be stripped, condensing the vapors as usual to form two liquid layers, an aqueous slightly alkaline lower layer and an upper layer consisting essentially of free aliphatic mercaptans. Alkyl phenols which are normally considerably more acidic than the mercaptans are dissolved preferentially in the slightly alkaline aqueous layer and only a small amount of mercaptans is usually dissolved therein, provided the mercaptans do not comprise a substantial amount of hydrogen sulphide and methyl mercaptans. Due to the solubility of the latter in water they would be dissolved in the aqueous layer, if present, and would be recirculated to the stripping zone together with the latter. This obviously is undesirable, and $H_2S$ and methyl mercaptans should therefore be separated from the overhead vapors by fractional condensation or distillation prior to introducing the caustic alkali solution into the overhead stream from the stripping operation.

Our invention will be more fully understood from the accompanying drawing which represents a flow diagram of a preferred form of our process.

An aqueous caustic alkali solution containing mercaptides and substantial amounts of alkyl phenolates enter the regenerating system through line 1 from an extraction system not shown. The solution passes through heat exchanger 2 and thence through lines 3 and 4, or 3 and 5, to enter steam stripper column 6 at points A or B, respectively. The solution flows downwardly through the column 6, in countercurrent to stripping steam. The stripped solution emerges from column 6 through bottom line 7, enters reboiler 8 where it is concentrated, vaporized water passing through line 9 to column 6 to serve as stripping steam. A small amount of air may be fed into the steam through line 10. This may be helpful in the removal of aromatic mercaptans, i. e. thiophenols which are more strongly acidic than the aliphatic mercaptans. Regenerated alkali alkyl phenolate solution is withdrawn from reboiler 8 through line 11 to be used in the extraction of further amounts of mercaptans from their solutions in water immiscible solvents.

As the stripping steam passes upwardly through column 6 in countercurrent to the descending alkyl phenolate mercaptide solution, it liberates alkyl phenols and mercaptans which are carried away together with the steam through overhead vapor line 12. If the phenolate mercaptide solution is fed to column 6 at point B, an amount of water may be introduced at point A to serve as a reflux. This has the effect of preferentially absorbing or condensing alkyl phenols, so that the vapors escaping through line 12 have a content of alkyl phenols lower than if the solutions were fed at point A. However, due to the limited amount of reflux water which may be used without materially impairing the economical efficiency of the process, a certain amount of alkyl phenols usually will escape through line 12. This amount will, of course, vary between wide limits depending on factors such as amount of reflux used, type and concentration of alkyl phenolates in the solution, etc. While it is practically impossible to calculate with any degree of accuracy the amount of alkyl phenolates which will be contained in the vapors, this amount may be determined easily and quickly by chemical analysis.

The overhead vapors thus containing mercaptans, alkyl phenols and possibly some $H_2S$, are condensed in heat exchanger 2 in indirect heat exchange with phenolate mercaptide solution. The condensation in heat exchanger 2 is controlled so that the condensate emerges through line 13 and enters trap 14, at about its boiling point. Under these conditions $H_2S$ and light mercaptans such as methyl and ethyl mercaptans boiling substantially below the boiling point of water and more particularly below the temperature at which the condensate enters the trap, remain uncondensed and escape from trap 14 through line 15. The condensation in heat exchanger 2 may be regulated by conducting a portion of the cold phenolate mercaptide solution in line 1 through line 16 which by-passes heat exchanger 2.

Hot condensate substantially free from $H_2S$ and light mercaptans is now conducted from trap 14 through cooler 17 in line 18 to separating tank 19, where two separate liquid layers are allowed to segregate, a lower aqueous layer and an upper layer comprising predominantly mercaptans. In order to prevent alkyl phenols from being dissolved in the mercaptan layer, a small amount of caustic alkali sufficient to cause dissolution of the alkyl phenols in the aqueous layer, without substantially dissolving mercaptans therein, preferably from about .5 to 5 times the equivalent of the alkyl phenols contained in the overhead stream from stripper 6 is injected into said stream at some convenient point prior to the separation of the two liquid layers. If the stream is substantially free from $H_2S$ and methyl mercaptans, the caustic alkali may be injected through line 20 into the vapors. On the other hand if $H_2S$ and/or methyl mercaptans are present in substantial amounts, it may be desirable to separate these compounds by partial condensation as previously described, or by equivalent means, before injection of the caustic alkali, since in the presence of the caustic alkali they would be dissolved in the aqueous layer together with the alkyl phenols. In the latter case the required amount of caustic alkali is preferably injected into line 18 at a point intermediate between trap 14 and cooler 17 through line 21.

The injected caustic alkali may be taken from any outside source not shown preferably in the form of an aqueous solution, the concentration of which may vary between extremely wide limits, e. g., from .1 to 12 normal. It may be desirable to choose a concentration so that the amount of water introduced thereby compensates evaporation and other losses of water in the closed cyclic process of extracting mercaptans with caustic alkali solution and regenerating the solution. If desired, regenerated caustic alkali alkyl phenolate solution may be used. We prefer however to divert for this purpose a portion of the phenolate mercaptide solution which enters our system through line 1, in an amount containing free caustic alkali equivalent to about .5 to 5 times the phenolate content in the overhead stream from stripper 6.

The possible retention of $H_2S$ and methyl mercaptan in the condensate above referred to would be undesirable, because the condensed water in tank 19 after separation of the liquid heavier mercaptans is preferably returned to the stripper 6. This return of the water of condensation is desirable if not necessary, for three reasons. Firstly the phenolate mercaptide solution to be stripped must be diluted with water prior to the stripping operation in accordance with the principles disclosed in our copending application Serial No. 174,512, filed November 15, 1937. While for this purpose water from any source may be used, the condensate provides the correct amount and is convenient to use. Secondly the condensed water contains small amounts of alkyl phenols even if no caustic alkali is injected into the overhead stream from the stripping operation. This makes disposal other than recirculation difficult because of the toxicity of alkyl phenols. Thirdly the alkyl phenols which come overhead with the steam, if not returned to the caustic alkali phenolate solution, represent a distinct loss, which causes a considerable depreciation in the extraction power for mercaptans of the caustic alkali phenolate solution. For these reasons the aqueous layer in tank 19 is recirculated to stripper 6 in one or both of two ways. It may pass from tank 19 through line 22 to join the phenolate mercaptide solution in line 1, thereby diluting the latter; or it may be routed through line 23 and 4 to enter scrubber 6 at point A to serve as reflux, and as diluent after reaching point B in its downward flow through the stripper 6.

While in the foregoing we have described a flow diagram of a preferred mode of operation, it shall be understood that many modifications are possible. For example, the trap 14 may be omitted if $H_2S$ and methyl mercaptans are absent; or instead of a trap, a reboiler or reflux condenser may be used. Similarly additional heat exchangers not shown may be used to increase the thermal efficiency of the system; likewise the installation of pumps, valves, and storage tanks at convenient or necessary points is considered to be within the skill of the designer for equipment of the type described.

In the foregoing we have repeatedly referred to alkyl phenols, phenols, etc. These terms designate mixtures of hydroxy aromatic compounds which may be obtained by extracting cracked petroleum distillates or coal tar distillates boiling above about 175° C. with strong aqueous solutions of a caustic alkali, and acidifying the extract so obtained. Depending upon their source, these mixtures may or may not contain varying amounts of phenol (mono hydroxy benzene).

We claim as our invention:

1. In the process of removing aliphatic mercaptans by steam stripping from an aqueous solution of a substantially non-volatile caustic alkali containing mercaptides and alkyl phenolates to produce a stripped solution of reduced mercaptide content and an overhead mixture comprising water, mercaptans and alkyl phenols, and condensing the overhead mixture to produce two liquid layers, a lighter layer consisting predominantly of mercaptans and a heavier aqueous layer, the improvement comprising contacting said overhead stream with an amount of caustic alkali under conditions to dissolve said alkyl phenols in the aqueous layer without dissolving therein a substantial amount of the mercaptans.

2. In the process of removing aliphatic mercaptans by steam stripping from an aqueous solution of a substantially non-volatile caustic alkali, containing mercaptides and alkyl phenolates, to produce a stripped solution of reduced mercaptide content and an overhead mixture comprising water, mercaptans and alkyl phenols, and condensing the overhead mixture to produce two liquid layers, a lighter layer consisting predominantly of mercaptans and a heavier aqueous layer, the improvement comprising contacting said overhead mixture with an amount of caustic alkali equivalent to from about .5 to about 5 times the alkyl phenol content of said overhead mixture.

3. In the process of removing aliphatic mercaptans by steam stripping from an aqueous solution of a substantially non-volatile caustic alkali containing mercaptides and alkyl phenolates, to produce a stripped solution of reduced mercaptide content and an overhead mixture comprising water, mercaptans and incidentally alkyl phenols, condensing the overhead mixture to produce two liquid layers, a lighter layer consisting predominantly of mercaptans and a heavier aqueous layer, the improvement comprising contacting said overhead mixture with an amount of said aqueous solution containing free caustic alkali equivalent to .5 to 5 times the equivalent of said overhead mixture.

4. In the process of removing aliphatic mercaptans by steam stripping from an aqueous solution of a substantially non-volatile caustic alkali containing mercaptides and alkyl phenolates to produce a stripped solution of reduced mercaptide content and an overhead mixture comprising water, mercaptans and alkyl phenols, and condensing the overhead mixture to produce two liquid layers, a lighter layer consisting predominantly of mercaptans and a heavier aqueous layer, the improvement comprising contacting said overhead stream with an amount of caustic alkali under conditions to dissolve said alkyl phenols in the aqueous layer without dissolving therein a substantial amount of the mercaptans, separating said layers and combining said aqueous layer with said aqueous solution.

5. In the process of removing aliphatic mercaptans by steam stripping from an aqueous solution of a substantially non-volatile caustic alkali, containing mercaptides including methyl mercaptide and alkyl phenolates, to produce a stripped solution of reduced mercaptide content and a vaporous mixture comprising steam, mercaptans including methyl mercaptan, and alkyl phenols, the improvement comprising condensing said mixture under conditions to produce a hot condensate consisting of two liquid layers substantially free from methyl mercaptan and a residual vapor comprising methyl mercaptan, separating said residual vapor from the hot condensate, adding to the latter an amount of caustic alkali equivalent to about .5 to 5 times the alkyl phenol content of said mixture, allowing said liquid layers to separate, thereby producing a slightly alkaline reacting aqueous layer containing alkyl phenolates and layer consisting predominantly of mercaptans heavier than methyl mercaptans, and separating the layers.

6. In the process of removing aliphatic mertaptans by steam stripping from an aqueous solution of a substantially non-volatile caustic alkali, containing mercaptides heavier than methyl mercaptide only and alkyl phenolates, to produce a stripped solution of reduced mercaptide content and a vaporous mixture comprising steam, mercaptans and alkyl phenols, the improvement comprising injecting into said vaporous mixture an amount of caustic alkali equivalent to about .5 to 5% of the alkyl phenol content of said mixture, condensing the resulting mixture, whereby two liquid layers are produced, a slightly alkaline reacting aqueous layer containing alkyl phenolates and a layer consisting predominantly of mercaptans and separating the layers.

7. In the process of separating aliphatic mertaptans by steam stripping from an aqueous solution of a substantially non-volatile caustic alkali, containing mercaptides and alkyl phenolates, the steps comprising passing said solution downwardly in countercurrent to stripping steam to produce a stripped solution and a vaporous mixture comprising steam, mercaptans and alkyl phenols, subjecting said mixture to a refluxing operation with a reflux comprising water, whereby a portion of the alkyl phenols are condensed and separated from said mixture thereby producing a scrubbed vaporous overhead mixture which consists essentially of water, mercaptans and residual alkyl phenols and forms upon condensation two separate liquid layers, an aqueous layer and a layer comprising mercaptans, condensing said scrubbed mixture, injecting into the scrubbed mixture an amount of said aqueous solution containing free caustic alkali equivalent to .5 to 5 times the alkyl phenol content of said scrubbed mixture, separating the two liquid layers and using the aqueous layer as reflux in said refluxing operation.

DAVID LOUIS YABROFF.
ELLIS R. WHITE.